March 10, 1931. A. A. HARDWICK 1,795,392
APPLE PICKER
Filed Jan. 4, 1929
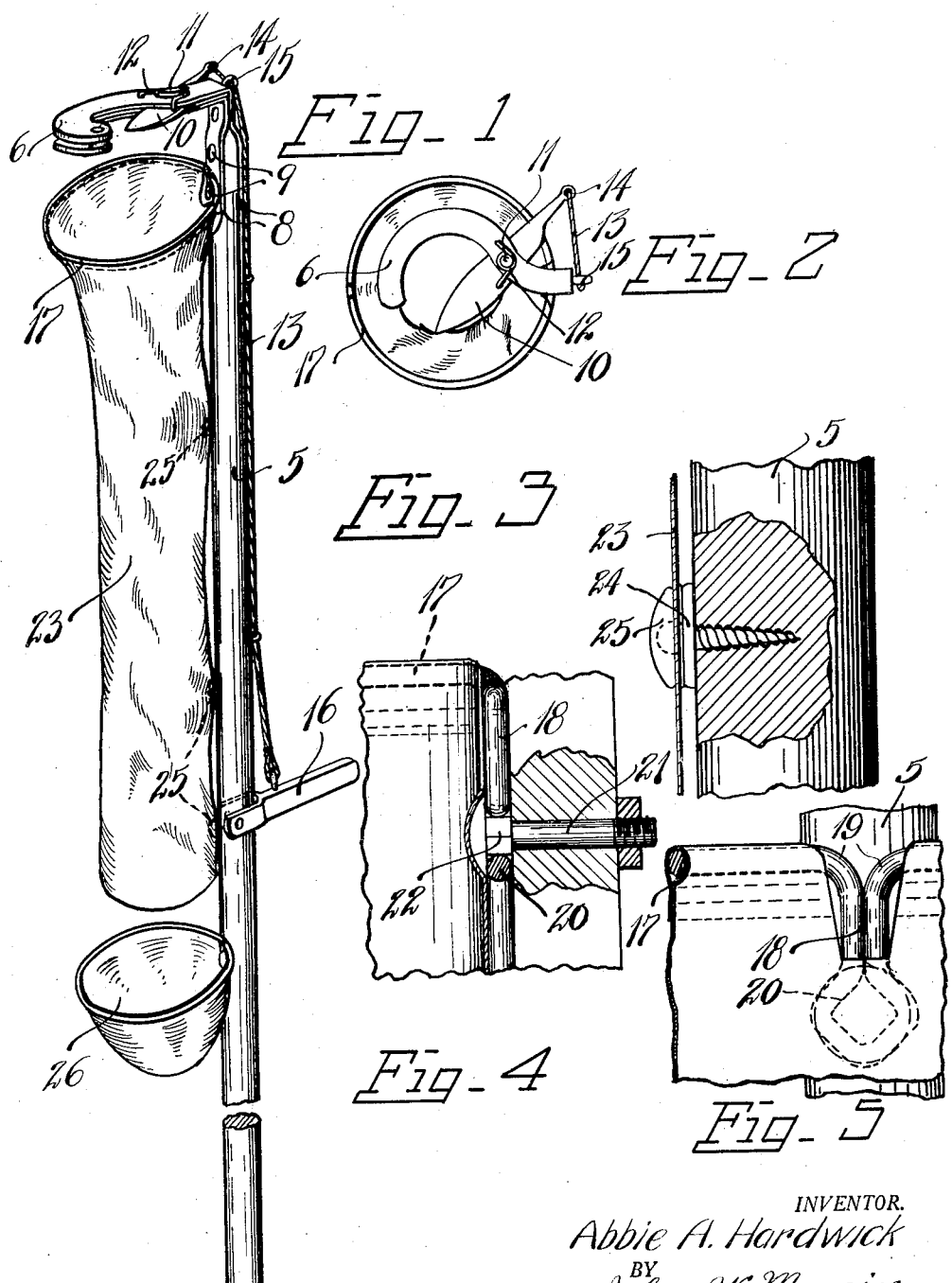
INVENTOR.
Abbie A. Hardwick
BY
John W. Maupin
ATTORNEYS.

Patented Mar. 10, 1931

1,795,392

UNITED STATES PATENT OFFICE

ABBIE A. HARDWICK, OF SPOKANE, WASHINGTON

APPLE PICKER

Application filed January 4, 1929. Serial No. 330,199.

My invention relates to apple pickers and certain objects of the invention are to provide an apple picker that will obviate the use of a ladder in high places and which is supported by a pole and operated by a lever whereby the apples when picked drop through a contracted flexible funnel or tube into a receiving cup or other receptacle and in falling through the fabric tunnel are freed of all deleterious accumulations such as the remains from poisonous spray, dust and the like and are thereby in edible condition and ready for consumption without further cleaning. Further objects are to provide certain novel means for mounting and fastening the several structural parts together.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a view in perspective of the device as a whole;

Fig. 2 is a top plan view of the same;

Fig. 3 is a view partly in vertical section and partly in elevation showing the means for fastening the funnel to the pole;

Fig. 4 is a fragmentary view partly in vertical section and partly in side elevation and showing the means for securing the funnel supporting hoop to the pole; and Fig. 5 is a view in front elevation of Fig. 4.

Referring to the drawings throughout which like reference numerals designate like parts, the numeral 5 indicates a wooden pole which is preferably long enough to reach the top of an ordinary apple tree. A pair of corresponding hooked jaws 6 are secured in spaced relation by riveting their ends together. Said ends are bent at right angles to the jaws immediately above said rivet and their lower or vertical portions 8 are spread apart to straddle the top of the pole and are secured rigidly thereto by bolts or other fastenings 9.

A blade member 10 is disposed between the stationary jaws 6 and pivotally held therebetween by a pin 11. A spring 12 holds said blade normally in the open position as shown in the drawings. A cord or rope 13 is secured at 14 to the outer end of said blade and passes through an eye 15 on the bent portion of said jaws from whence it extends downwardly to a hand lever 16 pivoted to the pole 5. It will now be obvious that an apple may be picked from a tree by catching its stem between the hooked jaws and blade member and pulling on said lever.

A hoop or ring 17 is secured to the pole 5 a short distance below the jaws 6 and at right angles thereto by bringing a portion 18 thereof together, bending said portion downwardly at 19 and forming a square loop 20 in its end as clearly shown in Fig. 5. As shown in Fig. 4, a bolt 21, secured through said pole and having its square shank 22 fitting snugly within said square loop, holds said hoop securely at right angles to said pole and prevents it from pivotal movement.

A funnel shaped or tubular fabric member 23 has its upper edge sewed or otherwise secured to the hoop 17 and extends downwardly along the pole 5 to which it is secured by a plurality of spaced buttons 24 screwed into said pole and passing through said member with snap heads 25 to hold it in place. It will be understood that said tubular member is made of such contractible fabric that it normally assumes a sufficiently small diameter below the hoop member so that its sides will contact with any apple passing therethrough regardless of its size.

A receiving cup or other receptacle 26, preferably having a round bowl shaped bottom, is secured to the pole 5 directly under the lower end of the tubular member 23 to catch the apples falling therethrough. In passing through said member and in frictional engagement with the sides thereof the apples will be freed of all foreign substance and thoroughly cleaned, and thus, when they are removed from the receiving cup, they are in condition for consumption as will be understood.

Having thus described my invention, it being understood that minor changes may be resorted to in its construction without departing from its scope and spirit, what I claim and desire to secure by Letters Patent of the United States is:—

An apple picker comprising a pole, a lever controlled picking device secured to an end of the pole, a hoop below said picking device, securing means for said hoop adapted to prevent pivotal movement thereof, a tubular contractible fabric member secured to said hoop and adapted to engage an apple throughout its descent, spaced snap buttons for securing said tubular member to the pole, and a receiving member below said tubular member.

In testimony whereof I affix my signature.

ABBIE A. HARDWICK.